US012768469B2

(12) United States Patent
Van Den Berg

(10) Patent No.: US 12,768,469 B2
(45) Date of Patent: Oct. 20, 2026

(54) VALVE MODULE FOR USE WITH CLAMPING TABLE FOR FLEXIBLE MATERIALS HAS VALVE FOR MODEL-BASED DETERMINATION OF FLUID PRESSURE AND METHOD FOR OPERATING THE VALVE MODULE

(71) Applicant: FESTO SE & CO. KG, Esslingen (DE)

(72) Inventor: Max Van Den Berg, Woerden (NL)

(73) Assignee: Festo SE & Co. KG, Esslingen (DE)

( * ) Notice: Subject to any disclaimer, the term of this patent is extended or adjusted under 35 U.S.C. 154(b) by 246 days.

(21) Appl. No.: 18/712,548

(22) PCT Filed: Nov. 10, 2022

(86) PCT No.: PCT/EP2022/081399
§ 371 (c)(1),
(2) Date: May 22, 2024

(87) PCT Pub. No.: WO2023/094167
PCT Pub. Date: Jun. 1, 2023

(65) Prior Publication Data

US 2025/0020238 A1 Jan. 16, 2025

(30) Foreign Application Priority Data

Nov. 29, 2021 (DE) ..................... 10 2021 213 421.1

(51) Int. Cl.
*F16K 37/00* (2006.01)

(52) U.S. Cl.
CPC ................................ *F16K 37/0091* (2013.01)

(58) Field of Classification Search
None
See application file for complete search history.

(56) References Cited

U.S. PATENT DOCUMENTS 4,015,473 A 4/1977 Kleuters et al.
5,564,682 A 10/1996 Tsuji
(Continued)

FOREIGN PATENT DOCUMENTS

DE 25 49 002 5/1976
DE 10 2008 029 641 12/2009
(Continued)

OTHER PUBLICATIONS

Examination Report issued in corresponding German Patent Application No. 10 2021 213 421.1, Aug. 5, 2022, 7 pages.
(Continued)

*Primary Examiner* — Peter J Macchiarolo
*Assistant Examiner* — Jermaine L Jenkins
(74) *Attorney, Agent, or Firm* — HSML P.C.

(57) ABSTRACT

A valve module, including a valve controller, at least one valve and at least one fluid channel, in which a first end region of the fluid channel is equipped with a fluid coupling and in which a second end region of the fluid channel is connected to the valve. The valve influences a fluid flow in the fluid channel, in which a sensor is assigned to the fluid channel, which sensor determines a flow rate value in the fluid channel and which sensor is electrically connected to the valve controller, in which the valve controller performs a model-based determination of a fluid pressure using the flow rate value for a measuring point located outside the valve module.

10 Claims, 3 Drawing Sheets

(56) References Cited

U.S. PATENT DOCUMENTS

| | | | |
|---|---|---|---|
| 9,581,607 | B2 * | 2/2017 | Kruckow .......... B01L 3/502707 |
| 10,067,427 | B2 * | 9/2018 | Kawahara ............... G03F 7/707 |
| 2011/0155259 | A1 | 6/2011 | Volpert et al. |
| 2013/0258309 | A1 | 10/2013 | Endo |
| 2016/0271805 | A1 | 9/2016 | Kuolt et al. |
| 2017/0192359 | A1 | 7/2017 | Leenders et al. |

FOREIGN PATENT DOCUMENTS

| | | | |
|---|---|---|---|
| DE | 10 2011 100 327 | | 8/2012 |
| DE | 10 2015 202 603 | | 8/2016 |
| DE | 10 2017 127 673 | | 5/2018 |
| EP | 3 223 073 | | 9/2017 |
| JP | 8-31515 | B | 3/1996 |
| KR | 10-0169284 | B | 2/1999 |
| KR | 10-2160783 | B | 9/2020 |
| KR | 10-2021-0110424 | | 9/2021 |

OTHER PUBLICATIONS

International Search Report issued in International Application No. PCT/EP2022/081399, Feb. 28, 2023, 6 pages w/translation.

Office Action issued in corresponding Korean Patent Application No. 10-2024-7012899, May 11, 2026, 20 pages w/translation.

* cited by examiner

VALVE MODULE FOR USE WITH CLAMPING TABLE FOR FLEXIBLE MATERIALS HAS VALVE FOR MODEL-BASED DETERMINATION OF FLUID PRESSURE AND METHOD FOR OPERATING THE VALVE MODULE

The invention relates to a valve module for use with a clamping table for flexible materials, in particular for silicon wafers, such as are used in the manufacture of semiconductor components. In this case, the valve module and the clamping table form a clamping device with which the flexible material, in particular the respective silicon wafer, which is also referred to as a wafer, can be clamped in a reproducible manner on a clamping surface of the clamping table as evenly as possible. This ensures that processing operations on the surface of the silicon wafer, known as wafer processing, can be carried out with a flat surface of the wafer. Such a clamping device can also be used to fix thin metal sheets or plastic films (with or without fabric reinforcement). The invention also relates to a method for operating such a valve module.

In order to ensure the most even clamping possible for the flexible material, in particular for a silicon wafer, the clamping table is provided with a clamping surface. The clamping surface is provided with a plurality of suction openings, wherein each of the suction openings being connected to a suction channel through which air can be sucked. Herewith a vacuum between the clamping surface and the underside of the silicon wafer is established which allows to fix the silicon wafer on the clamping surface. The clamping surface is typically provided with a large number of small elevations, all of which extend to a common clamping plane, which is the plane in which a mechanical contract between the wafer and the clamping surface is established. The small elevations ensure that the vacuum acts nearly on the whole underside of the silicon wafer since the wafer is also sucked away from the suction openings and the small elevations ensure pressure equalization between the suction openings.

Each of the suction channels is connected to a fluid coupling of the valve module, in particular by a hose. Starting from the fluid coupling, a fluid channel extends in the valve module, in which a valve is located, which is provided for influencing a fluid flow between the fluid coupling and a supply connection formed on the valve module. This supply connection can, for example, be used to provide compressed air which has an overpressure compared to an environment of the clamping table, wherein the clamping table may be accommodated in a process chamber. In addition, or alternatively the supply connection may be used to provide a vacuum, which means a negative pressure compared to an environment of the clamping table, wherein the clamping table may be accommodated in a process chamber.

Furthermore, a sensor is assigned to each of the fluid channels of the valve module, with which a flow rate value can be determined in the respective fluid channel. A flow rate value determined by the sensor is provided to a valve controller which is electrically connected to the respective sensor. Preferably the valve controller is a microcontroller or a microprocessor. A computer program is stored in the valve controller, which computer program can be used to process the sensor signals of the respective sensor.

SUMMARY OF THE INVENTION

The task of the invention is to provide a valve module and a method for operating such a valve module, with which differently curved flexible materials can be reliably clamped onto the clamping table.

According to a first aspect of the invention this task is solved for the valve module according to the type mentioned above in that the valve module comprises at least one fluid channel, wherein a first end region of the fluid channel is provided with a fluid coupling for connection to a suction channel of the clamping table and wherein a second end region of the fluid channel is connected to a valve, the valve being designed for influencing a fluid flow between the fluid coupling and a supply connection formed on the valve module, wherein a sensor is assigned to the fluid channel, which sensor determines a flow rate value in the respective fluid channel and which sensor is electrically connected to a valve controller, wherein the valve controller determines a fluid pressure at a measuring point arranged outside the fluid channel, in particular at a measuring point in the intake channel of the clamping table or at a measuring point at an intake opening of the intake channel, using a model-based determination algorithm and the flow rate value.

In particular the valve module comprises a valve controller, at least one valve and at least one fluid channel, wherein a first end region of the fluid channel is equipped with a fluid coupling and wherein a second end region of the fluid channel is connected to the valve, wherein the valve influences a fluid flow in the fluid channel, wherein a sensor is assigned to the fluid channel, which sensor determines a flow rate value in the fluid channel and which sensor is electrically connected to the valve controller, wherein the valve controller performs a model-based determination of a virtual fluid pressure using the flow rate value for a measuring point located outside the valve module.

By using a model-based determination of a fluid pressure, a fluid pressure can be determined with high precision at a (virtual) measuring point that is located away from the valve module, wherein this measuring point is not equipped with a pressure sensor and the determination of the fluid pressure at this measuring point is based on a mathematical model. For this purpose, it is necessary that the fluid properties such as a flow resistance and/or a length of a fluid line between the sensor and the measuring point are known and that the algorithm which is based on a mathematical model is stored in the valve controller, with the help of which a flow value at the desired measuring point can be calculated from the sensor signals provided by the sensor, taking into account the fluid properties of the fluid line. Such a procedure is also referred to as an observer, as a physical variable can be determined in the form of a measured value for the measuring point, even though no sensor of the sensor is placed at the measuring point. This model-based determination of the fluid pressure is of particular interest if, for technical reasons, it is difficult or even impossible to place the sensor directly at the measuring point for spatial and/or technical reasons.

To determine the fluid pressure on the basis of the flow rate value, which is determined with the sensor, which is located remote from the measuring point, an abstractly defined model can be used, for example, which is based exclusively on theoretical considerations. It is preferable that the model used to determine the fluid pressure also contains an empirical component that is based, for example, on a series of measurements carried out in advance with the specific combination of valve module, fluid hoses and clamping table. For this purpose, the use of a neural network can also be provided, with which, for example, an interpolation of fluid pressures can be carried out for which no specific measured values were determined.

For example, the measuring point may be located in the suction channel of the clamping table or at a suction opening arranged on a clamping surface of the clamping table. This is of particular interest if the fluid pressure determined on the basis of the model is intended to enable a statement to be made about the way in which a flexible material to be clamped onto the clamping table, in particular a silicon wafer, rests on the clamping surface of the clamping table with the aid of the corresponding suction channel, in particular using the corresponding suction opening.

Advantageous further embodiments of the invention are the subject of the subclaims.

It is expedient if the sensor, which also may be called a sensor arrangement, comprises a first pressure sensor attached to the fluid channel and a second pressure sensor attached to the fluid channel at a distance from the first pressure sensor, wherein the fluid channel between the first pressure sensor and the second pressure sensor is a measuring section, in particular provided with a throttle. The first pressure sensor and the second pressure sensor are electrically connected to the valve controller, which is designed to process a first sensor signal from the first pressure sensor and a second sensor signal from the second pressure sensor to form the model-based fluid pressure at the (virtual) measuring point.

In particular the sensor comprises a first pressure sensor attached to the fluid channel and further comprises a second pressure sensor attached to the fluid channel at a distance from the first pressure sensor, wherein a section of the fluid channel between the first pressure sensor and the second pressure sensor serves as a measuring section and wherein the first pressure sensor and the second pressure sensor are electrically connected to the valve controller, which valve controller processes a first sensor signal from the first pressure sensor and a second sensor signal from the second pressure sensor to determine the model-based fluid pressure at the measuring point.

Such a sensor can be implemented cost-effectively and adapted to the respective conditions in the fluid channel, even if the fluid flowing in the fluid channel is exclusively gaseous. For this purpose, it is provided that the first pressure sensor is attached to a first end of the measuring section and that the second pressure sensor is attached to a second end of the measuring section at a distance from the first end of the measuring section, whereby the fluid properties of the measuring section, in particular the flow resistance for the measuring section, are known for the flow rate of interest in practice and are stored in a mathematical formula or in a table of values in the valve controller.

For precise determination of small flow values, it is advantageous if the measuring section has a greater flow resistance than adjacent sections of the fluid channel in order to be able to generate the greatest possible pressure difference across the measuring section and thus ensure a particularly precise measurement result. In this case, it is advantageous if a cross-sectional constriction of the fluid channel, also known as a restrictor or a throttle, is provided in the area of the measuring section between the first pressure sensor and the second pressure sensor. Such a cross-sectional constriction can be designed in particular as an annular orifice, whereby it is assumed in this context that the fluid channel has a circular cross-section. It is understood that other cross-sections for the fluid channel and the cross-sectional constriction to be provided in the area of the measuring section can also be realized.

It is preferable that the valve controller determines the fluid pressure at the measuring point using the flow rate value and a pressure signal from the group: first pressure signal, second pressure signal. Here, the model for determining the fluid pressure at the measuring point is configured in such a way that at least one pressure signal from the sensor is included in addition to the determined flow rate value. Preferably, the pressure signal of the pressure sensor of the sensor that has the smaller distance from the measuring point is included in the model.

In a further development of the invention, it is provided that the valve controller carries out pressure control at the measuring point. In this case, it is provided that for the measuring point, which can be positioned, for example, at the intake opening of the intake duct, the fluid pressure is determined recurrently, in particular in time-constant sections, and is used as an actual value for a pressure regulator realized, in particular in software, in the valve controller, wherein this pressure regulator can optionally be designed to maintain a time-constant or a time-variable pressure at the measuring point.

According to a second aspect of the invention, a method for operating the valve module according to the invention is provided, which comprises the following steps: Connecting fluid couplings to suction ducts of a clamping table and applying a pressure-controlled vacuum to suction openings of the suction ducts, wherein the suction openings of different suction ducts are each arranged in mutually delimited surface areas of the clamping table, using the model-based determined fluid pressures at the suction openings serving as (virtual) measuring points. This procedure can be used to fix a flexible material, in particular a silicon wafer, on the clamping surface of the clamping table. By using a pressure control system that uses the fluid pressures determined on the basis of the model at the respective suction openings, it is possible to achieve the most homogeneous suction and even positioning of the flexible material.

In particular the method for operating a valve module is based on the valve module comprising a valve controller, at least one valve and at least one fluid channel, wherein a first end region of the fluid channel is equipped with a fluid coupling and wherein a second end region of the fluid channel is connected to the valve, wherein the valve influences a fluid flow in the fluid channel, wherein a sensor is assigned to the fluid channel, which sensor determines a flow rate value in the fluid channel and which sensor is electrically connected to the valve controller, wherein the valve controller performs a model-based determination of a fluid pressure using the flow rate value for a measuring point located outside the valve module, the method comprising the steps of: connecting the at least one fluid coupling of the valve module to an intake duct of a clamping table, which intake duct has intake openings being arranged in a mutually delimited surface region of the clamping table, wherein the measuring point is located at one of the intake-openings, carrying out an application of negative pressure or positive pressure to the intake openings, wherein the model-based fluid pressure is used for the pressure-controlled application of the negative pressure or the positive pressure at the intake openings In a further development of the method, it is provided that, prior to the step of applying a vacuum or negative pressure to the surface areas of the clamping table, the surface areas of the clamping table are negative pressurized (vacuum) or positive pressurized (overpressure) and that the fluid pressures determined on the basis of the model for the suction openings of the respective surface areas during the negative pressurization or positive pressurization are stored as reference pressures in the valve controller. For example, to determine the reference pressures, all valves can be partially opened by the same amount or, alternatively, fully opened to achieve a purely controlled (open loop) positive pressurization or negative pressurization of the surface areas of the clamping table. The reference pressures determined in this way can be used, for example, to draw conclusions about the respective flow resistance in the associated fluid channel and/or about the geometry of the flexible material resting on the clamping table but not yet fixed.

In particular the model-based fluid pressures determined for the intake openings of the respective surface regions during the negative pressure application, or the positive pressure application are stored as reference pressures in the valve controller.

In a further embodiment of the method, it is provided that the negative pressure or positive pressure is applied to the surface areas of the clamping table without a flexible material resting on the clamping table, in particular without a wafer, and that the determined reference pressures are stored as a first group of reference pressures in the valve controller. This makes it possible to characterize the properties of the respective fluid channel and the intake channel connected to it. The first group of reference pressures can be used, among other things, to define an individual degree of opening for each of the valves if, for example, the same flow rate value is to be present for all fluid channels and the associated intake channels and intake openings in the event of negative pressurization or positive pressurization.

In particular the provision of negative pressure or positive pressure to the surface regions of the clamping table is carried out without a flexible material resting on the clamping table and wherein the determined reference pressures are stored as a first group of reference pressures in the valve controller.

In addition, it is useful if the negative pressurization or pressurization of the surface areas of the clamping table is carried out with a flexible material resting on the clamping table, in particular with a silicon disc, and that the determined reference pressures are stored as a second group of reference pressures in the valve controller. In this way, a qualitative determination of a local flow resistance can be determined for each of the intake ducts and the fluid ducts connected to the intake ducts. This allows to draw conclusions about the geometry of the flexible material resting on the clamping table and not yet fixed by negative pressure. The geometry of the flexible material, in particular the silicon wafer, determined at least qualitatively in this way can then be used in the subsequent controlled (closed loop) negative pressure application for the specification of the respective negative pressure setpoints at the respective suction openings in order to achieve the desired flat contact of the flexible material with the clamping surface.

In particular the provision of negative pressure or positive pressure to the surface regions of the clamping table is carried out with a flexible material resting on the clamping table, and wherein the determined reference pressures are stored as a second group of reference pressures in the valve controller.

Preferably, it is provided that a distance between the flexible material, in particular the silicon wafer, resting on the clamping table and the respective surface area of the clamping table is determined in the valve controller for each surface area from the associated reference pressure of the first group of reference pressures and from the associated reference pressure from the second group of reference pressures, and that a target pressure for the subsequent application of negative pressure to the respective surface area is determined for each of the surface areas as a function of an amount of the determined distance.

In particular the valve controller determines a distance between the flexible material resting on the clamping table for each surface area from the respective reference pressure of the first group of reference pressures and from the respective reference pressure of the second group of reference pressures, and wherein a target pressure for the subsequent application of negative pressure to the respective surface region is determined for each of the surface regions as a function of an amount of the determined distance.

It is preferable for the valve controller to apply negative pressure to the surface areas of the clamping table in chronological order, whereby surface areas with a smaller distance to the flexible material, in particular to the silicon wafer, are subjected to negative pressure earlier compared with surface areas with a greater distance to the silicon wafer, and whereby a model-based actual pressure is determined for each of the surface areas, which actual pressure is used in the valve controller together with the respective target pressure for negative pressure control (closed loop) in the respective surface area. By influencing the time sequence for the application of negative pressure to the individual surface areas of the clamping table, an advantageous clamping of the flexible material can be achieved. In particular a formation of air cushions, which would jeopardize the flat contact of the flexible material, can be avoided by taking into account the geometry of the flexible material and using a sequence of the application of negative pressure to the individual surface areas that is matched to it.

It is preferably provided that the suction channel, which extends between the at least one suction opening and the fluid coupling, is divided into a first suction channel section and a second suction channel section. In this case, it may be provided that the first suction channel section extends in the clamping table and the second suction channel section extends outside the clamping table, with the sensor being assigned to the second suction channel section. Preferably, the respective sensor is arranged in the respective fluid coupling or adjacent to the respective fluid coupling of the valve module. For example, the first suction channel section is formed as a bore in the clamping table, wherein the clamping table is made of a shape-retaining metal or plastic material. The second suction channel section can be realized, for example, as a flexible, vacuum-resistant hose or a pipe.

By dividing the intake duct into the first suction channel section and the second suction channel section, it can be ensured that the sensor can be placed away from the clamping table, which is typically arranged in a process chamber of a processing machine for silicon wafers. This makes it possible, for example, to carry out maintenance on the sensor without having to enter the process chamber. Furthermore, this prevents the sensor from being exposed to the influences that are intended for processing the silicon wafers in the process chamber.

It is preferable for the clamping table that the suction openings of the respective suction channel are arranged within a surface area of the clamping surface and that several surface areas arranged adjacent to each other are formed on the clamping surface. This enables a locally different pressurization or vacuum pressurization of areas of the silicon wafer in order to ensure an advantageous suction of the silicon wafer for carrying out the processing step to be performed. This locally different pressurization or negative pressurization of the silicon wafer is of particular interest if the silicon wafer has lost the flatness which was originally present at the beginning of the processing steps for the silicon wafer. This could, for example, have been caused by previous processing steps for the silicon wafer. In this case, it is advantageous to provide an initially locally different and temporally coordinated actuation of the respective valves and a resulting local pressurization or negative pressurization for the respective surface areas in order to ensure that the silicon wafer rests on the clamping surface as flatly and evenly as possible.

In a further embodiment of the invention, it is provided that adjacent surface areas are formed without overlapping. This means that the boundaries of adjoining surface areas are preferably formed in a straight line or with a constant curvature. Alternatively, it can also be provided that the boundaries of adjacent surface areas are formed with a variable radius of curvature, whereby in this case it is assumed that the curvature of these boundaries has no inflection points and therefore there are no protrusions of a surface area relative to another adjacent surface area.

It is particularly advantageous if the valve controller is designed for sequential actuation of the valves assigned to the respective surface areas in a predefined sequence. The aim here is to ensure that the silicon wafer can be sucked onto the clamping surface over its entire surface despite any curvature. Therefore, it may be necessary to supply one or more surface areas with compressed air, while other surface areas are supplied with negative pressure in a predetermined sequence and finally the surface areas supplied with positive pressure are also supplied with negative pressure. Alternatively, a sequential negative pressure supply to the surface areas can also be provided without a temporary positive pressure supply to individual surface areas.

In particular the valve controller applies a negative pressure to the surface regions of the clamping table in succession over time, wherein surface regions having a smaller distance from the flexible material are subjected to negative pressure earlier than surface areas with a greater distance to the flexible material and wherein a model-based actual pressure is determined for each of the surface areas, which model-based actual pressure is used in the valve controller together with a respective predetermined target pressure for negative pressure control in the respective surface area.

Preferably, a pressure control (closed loop) or flow control (closed loop) is provided for each of the surface areas, so that a positive pressurization or a negative pressurization adapted to the actual geometry of the silicon wafer can be achieved for each of the surface areas. As an example, it is also possible to initially apply negative pressure to radially inner surface areas for the suction of the silicon wafer, while outer surface areas are either kept depressurized (with no pressure difference to an ambient pressure) or, if necessary, supplied with compressed air for positive pressurization. As the clamping process continues, these radially outer surface areas are also positive pressurized.

It is preferable for the surface areas to be circular or circular ring-shaped or circular ring section-shaped and arranged in concentric circular zones or ring zones or ring section zones. In this way, a sequential, outwardly advancing negative pressure application in a radial direction can be achieved for the typically circularly shaped silicon wafer by corresponding control of the associated valves, in order to ensure that even curved silicon wafers are fixed flat on the clamping table.

BRIEF DESCRIPTION OF THE DRAWINGS

An advantageous embodiment of the invention is shown in the drawing. Here shows.

DETAILED DESCRIPTION OF THE INVENTION

Figure 1:
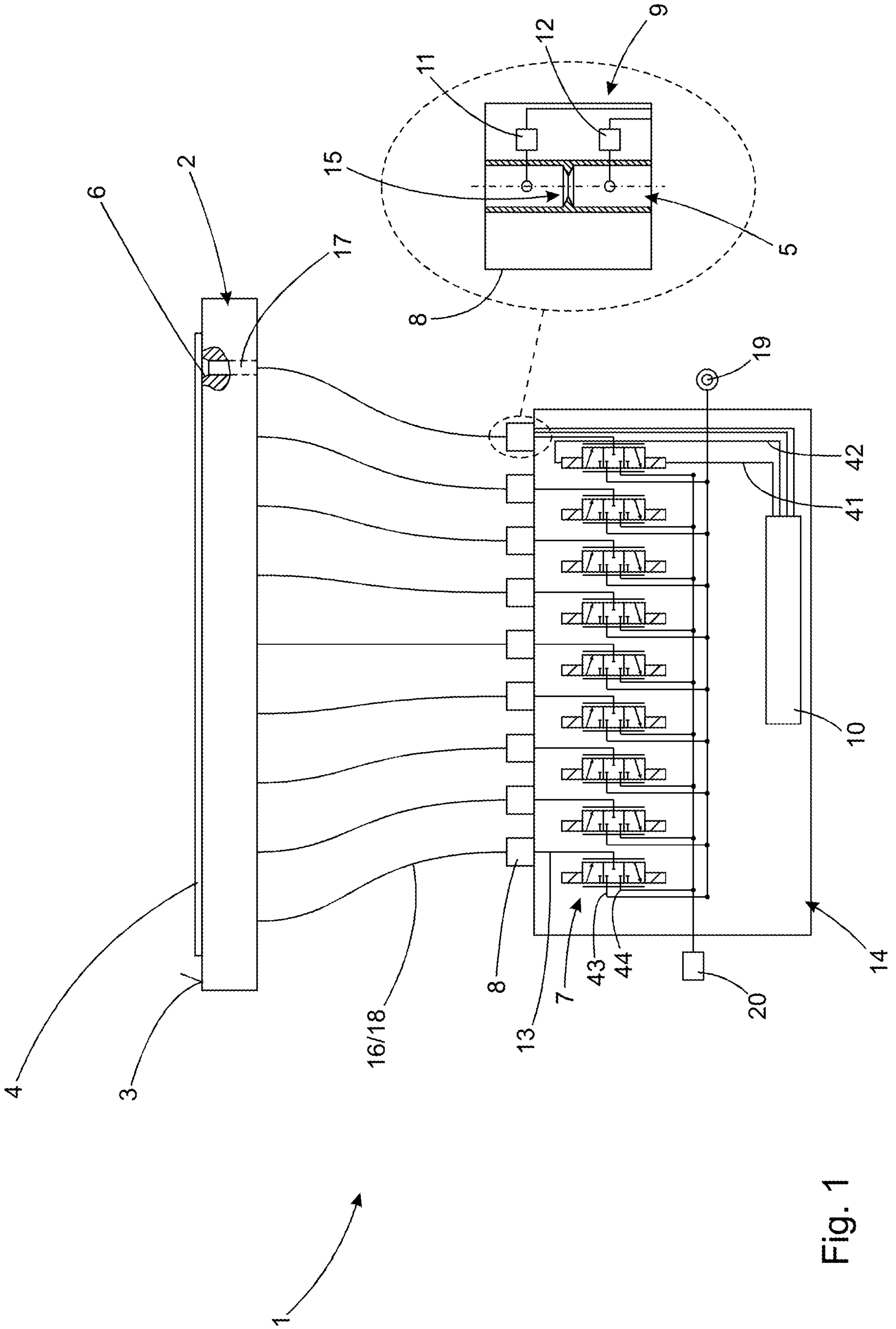
FIG. 1 a strictly schematic representation of a clamping device for silicon wafers with a clamping table, a valve and a valve controller, FIG. 2 a top view of the clamping table according to FIG. 1 with several surface areas that can be supplied by the associated valve controller, FIG. 3 a strictly schematic representation of a section of the clamping table and several suction channels with associated suction openings and the associated sensors, and FIG. 4 a strictly schematic time sequence diagram for the pressurization or vacuum pressurization of a silicon wafer.

A clamping device 1 shown in FIG. 1 is used for clamping and thus temporarily fixing a circular, plane-parallel silicon wafer 4, also known as a wafer, as used in the manufacture of semiconductor components.

For this purpose, the clamping device 1 comprises a clamping table 2, which is designed purely by way of example as a circular ring-shaped plate and whose upper side forms a clamping surface 3. As can be seen from the partially sectioned representation of FIG. 1, a plurality of first suction channel sections 17 are formed in the clamping table 2, which each pass through the clamping table 2 in a purely exemplary manner and have a suction opening 6 in the region of the clamping surface 3, which suction opening 6 is formed in the shape of a conical section in a purely exemplary manner. Each of the suction channel sections 17 in the clamping table 2 is in fluidic communication with a valve terminal 14 via a second suction channel section 18, also referred to as suction line 16. The first suction channel section 17 formed inside the clamping table 2 and the second suction channel section 18 formed outside the clamping table 2 form a suction channel 5.

A fluid coupling 8, shown only schematically, is arranged on the valve terminal 14 for each of the intake channels 5, from which a fluid channel 13 extends to a valve 7.

The valves 7 in the valve terminal 14 are connected to a pressure source 19 and to a pressure sink 20 via associated connection ports 43, 44 in order to enable the provision of a positive pressure (overpressure) and a negative pressure (vacuum)—each relative to an ambient pressure—to each of the valves 7. The valves 7, which are designed purely by way of example as 3/3-way proportional valves, can each individually establish a connection with the pressure source 19 or a connection with the pressure sink 20 for each of the intake ducts 5 or can also assume a blocking position in which there is no fluidic communicating connection with either the pressure source 19 or the pressure sink 20.

As an example, the valves 7 are designed as electromagnetically controlled spool valves. Alternatively, the valves can also be designed as fluidically pilot-controlled spool valves or as piezo valves, in particular as piezo bender valves.

Each of the valves 7 is electrically connected to a valve controller 10, which may, for example, be comprise a microprocessor on which a computer program runs to control the respective valves 7. For reasons of clarity, only electrical connection lines 41, 42 are shown between a valve 7 and the valve controller 10. In fact, all valves 7 are connected to the valve controller 10 via assigned electrical connection lines, so that the valve controller 10 can control each of the valves 7 individually.

In addition, each of the intake ducts 5 is assigned a sensor 9, which is arranged directly on the valve terminal 14 by way of example only. As can also be seen from the detailed illustration in FIG. 1, the sensor 9 comprises a section of the intake duct 5 in which a throttle orifice 15 is arranged, whereby a first pressure sensor 11 is arranged upstream of the throttle orifice 15 and a second pressure sensor 12 is arranged downstream of the throttle orifice 15. Since the geometry of the intake duct 5 and the throttle orifice 15 are known, a flow rate in the intake duct 5 can be determined based on a differential pressure, which is determined by calculating the difference between an electrical sensor signal from the first pressure sensor 11 and an electrical sensor signal from the second pressure sensor 12 in the valve controller 10. The sign of the differential pressure can be used to draw conclusions about the direction of flow for the fluid flow taking place in the intake duct 5.

Figure 2:
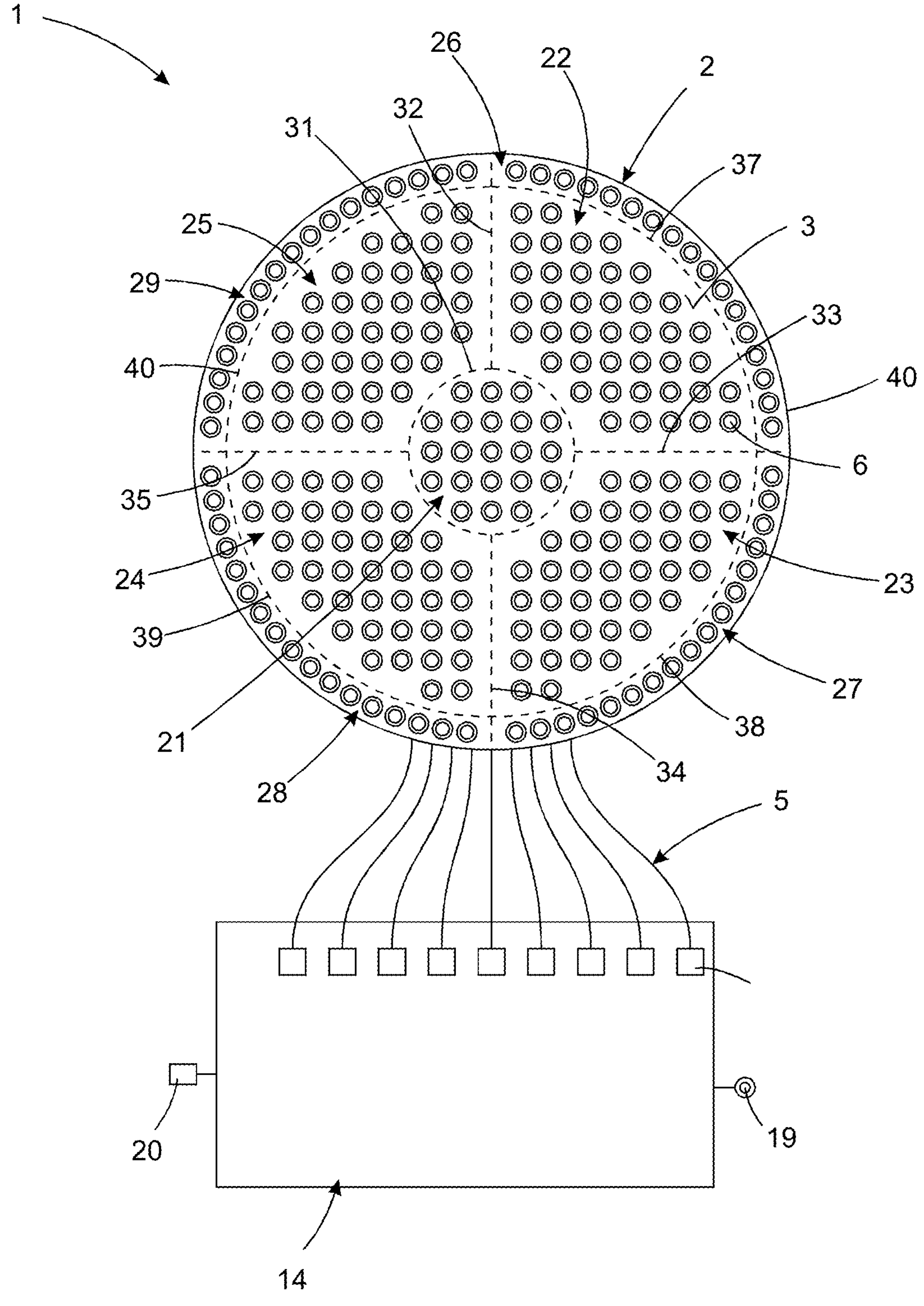

It can be seen from the illustration in FIG. 2 that a large number of suction openings 6 are formed on the clamping surface 3 of the clamping table 2. It can also be seen from the illustration in FIG. 2 that the suction openings 6 are arranged in several surface sections 21 to 29, which do not overlap one another. It is provided here that the suction openings 6 of the respective surface section 21 to 29 are each connected in communication with a respective common first suction channel section 17, which is formed within the clamping table 2. Each of the first suction channel sections 17 is in turn connected to a second suction channel section 18, which is coupled to the associated sensor 9 on the valve terminal 14.

For illustrative purposes only, dashed boundaries 31 to 39 are shown between the individual surface sections 21 to 29, which dashed boundaries 31 to 39 are used to describe the geometry of the individual surface sections 21 to 29.

By way of example only, the first surface section 21 is designed as a circular surface with a circular first boundary 31.

In a radial outward direction, four exemplary second, third, fourth and fifth surface sections 22, 23, 24 and 25, each formed in the same way as circular ring sections, adjoin the first surface section 21 and, in addition to the first circular boundary 31, are bounded by rectilinear second, third, fourth and fifth boundaries 32, 33, 34 and 35 and circular section-shaped sixth, seventh, eighth and ninth boundaries 36, 37, 38, 39.

Furthermore, the second, third, fourth and fifth surface sections 22, 23, 24 and 25 are each adjoined by sixth, seventh, eighth and ninth surface sections 26, 27, 28 and 29 in the form of circular ring sections, which are also bounded by the rectilinear second, third, fourth and fifth boundaries, third, fourth and fifth boundaries 32, 33, 34, 35 as well as by the circular sixth, seventh, eighth and ninth boundaries 36, 37, 38, 39 and by a radially outer, circular tenth boundary 40.

Since the intake openings 6 in each of the surface sections 21 to 29 are each connected in fluidic communication with an associated intake duct 5, which in turn is connected in fluidic communication with the individually associated sensor 9 and the associated valve 7, the valve controller 10 can supply each of the surface sections 21 to 29 with an individual negative pressure (relative to an ambient atmosphere) or an individual positive pressure (relative to an ambient atmosphere).

As an example, provision can be made to apply negative pressure to the suction openings 6 in the different surface sections 21 to 29 at staggered over time (time shifted, time-delayed) intervals in order to be able to effect advantageous suction and fixation of a silicon disk 4 on the clamping surface 3.

A purely exemplary procedure for operating the clamping device 1 is described below:

In a first step, the sensors 9, which are assigned to the respective suction channels 5, are calibrated. For this purpose, the suction ducts 5 assigned to the respective surface sections 21 to 29 are first subjected to the working pressure provided by the pressure source 19, in particular in a sequential time-delayed order, and the respective differential pressure occurring at the respective throttle orifice 15 is measured. Based on the differential pressure determined, the resulting flow rate in the respective intake duct 5 is calculated in the valve controller 10 and the flow rate is stored in a storage device (not shown) of the valve controller 10.

After all surface sections 21 to 29 have been pressurized, the second step is to supply all surface sections 21 to 29 with negative pressure, whereby this negative pressurization is preferably carried out in a sequential and time-delayed order for the individual surface sections 21 to 29. The differential pressure occurring at the respective throttle orifice 15 during this application of negative pressure is also measured. The determined differential pressure is used to calculate the resulting flow rate in the respective intake duct 5 by means of the valve controller 10. The respective flow rates are stored in the storage device of the valve controller 10.

These two calibration steps make it possible to precisely determine the flow rate for each of the intake channels 5 for the clamping of a silicon wafer 4 to be carried out with the clamping device 1, so that, knowing the number of intake openings 6, a forecast can also be made as to which negative pressure or positive pressure is present in the respective surface section 21 to 29.

The aforementioned steps are typically carried out before the first clamping of a silicon wafer 4. In addition, these steps can also be carried out at regular or irregular intervals in order to be able to detect any changes in the flow characteristics for the individual suction channels 5 or in the sensor signals provided by the pressure sensors 11, 12. For this purpose, it is particularly advantageous if the flow rate values determined in each case are stored together with a time stamp so that any changes occurring in the individual intake channels 5 and/or the associated intake openings 6 of the respective surface section 21 to 29 can be analyzed at a later time.

In a third step, a silicon disk 4 (not shown in FIG. 2) can now be fixed to the clamping surface 3. It is assumed here that the clamping surface 3 is to be regarded as flat within the tolerances required for machining the silicon wafer 4. Furthermore, it is assumed that the silicon wafer 4 does not lie flat on the clamping surface 3 due to internal stresses, which may be caused by previous machining processes, for example, and has a concave or convex curvature of its circular disk-shaped surface, for example.

In order to be able to ensure reliable fixing to the clamping surface 3 despite a curvature of the silicon wafer 4, a flow measurement can be carried out in a third step for the individual surface sections 21 to 29 during a negative pressure application to these surface sections 21 to 29 with the silicon wafer 4 already resting on the clamping surface 3 but not yet fixed, in order to enable a qualitative determination of the geometry of the silicon wafer 4. It is assumed here that surface sections 21 to 29, in which there is no or only a slight flow reduction compared to the flow determination in the previous second step, have a greater distance to the clamping surface 3 than surface sections 21 to 29, in which there is a greater flow reduction or possibly a complete closure of all suction openings 6 of the respective surface section 21 to 29.

As soon as the valve controller 10 has made a qualitative determination of the geometry of the silicon disk 4 in this way, a targeted negative pressure can be applied to the individual surface sections 21 to 29 in a subsequent fourth step. Depending on the determined geometry of the silicon wafer 4, different strategies can be pursued for this purpose.

As an example, in a fifth step, provision can be made to first apply a vacuum to the first surface section 21 by corresponding activation of the associated valves 7 by the valve controller 10 and to provide flow control for this first surface section 21 using the sensor signals from the two pressure sensors 11, 12. To support the suction of the silicon wafer 4, it is additionally possible to provide at least a slight positive pressurization for the sixth to ninth surface sections 26 to 29 in order to generate an advantageous air flow in the gap between the silicon wafer 4 and the clamping surface 3.

For example, in a sixth step, provision can be made to apply negative pressure to the second surface section 22 and the diagonally opposite fourth surface section 24 in addition to applying negative pressure to the first surface section 21.

In a subsequent seventh step, provision can be made to switch off the pressurization of the sixth to ninth surface sections 26 to 29 and to apply negative pressure to the surface sections 23 and 25 in addition to the surface sections 21, 22 and 24.

In an eighth step, provision can be made to also apply negative pressure to the sixth surface section 26 and the eighth surface section 28 and then, in a ninth step, to also apply negative pressure to the 17th surface section 27 and the ninth surface section 29.

It is understood that, in particular depending on the determined geometry of the silicon wafer 4, other procedures for the ventilation and deaeration of the respective surface sections 21 to 29 are also possible in order to achieve a planar contact of the silicon wafer 4 with the clamping surface 3.

In particular, it may be provided that an individual flow control (closed loop) or an individual force control (closed loop) made possible by including the respective surface of the surface section 21 to 29 is carried out for each of the surface sections 21 to 29 depending on sensor signals of the respectively assigned sensor 9.

Figure 3:
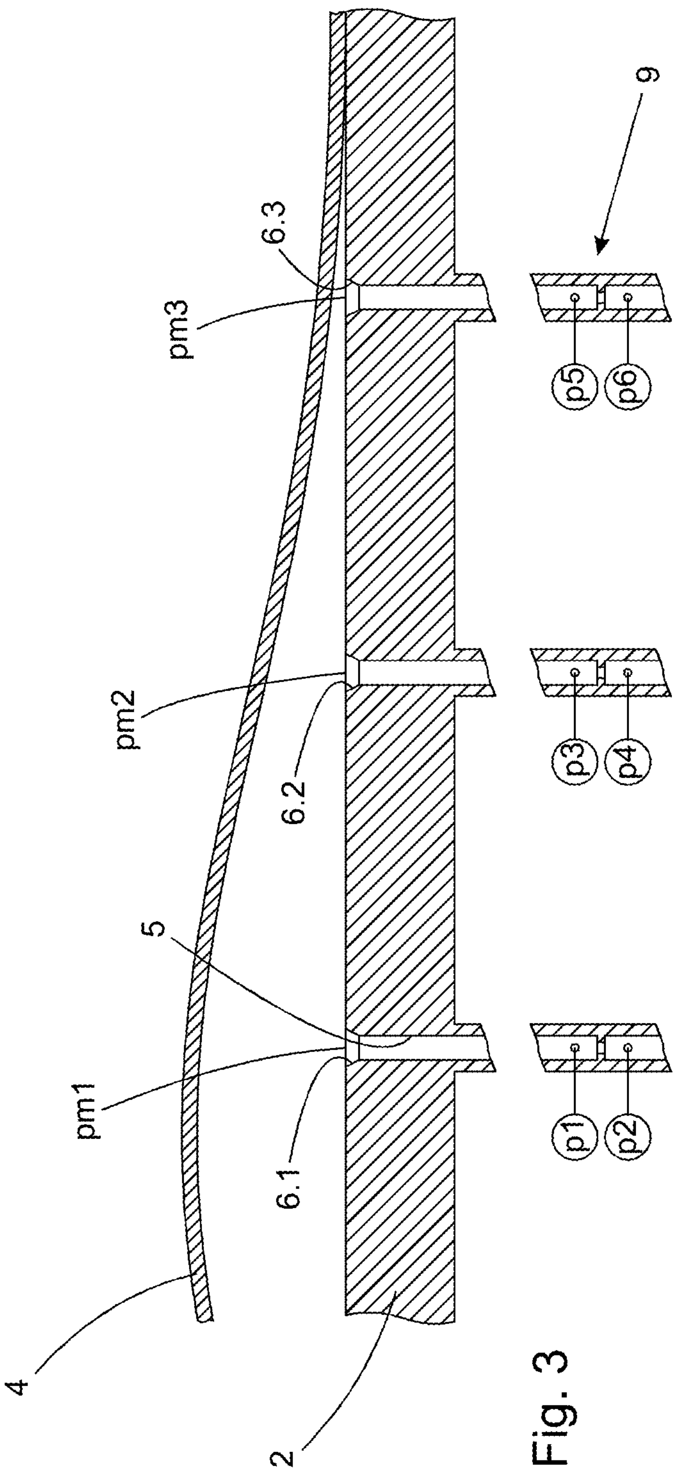

FIG. 3 shows a purely schematic representation of several intake ducts 5 with associated intake openings 6, whereby each of the intake ducts 5 is associated with a sensor 9. A first pressure p1, p3, p5 and a second pressure p2, p4, p6 is determined with the respective sensor 9, with each of these pressures being provided as an electrical sensor signal to the valve controller 10. In the valve controller 10, differential pressures are determined for the sensors 9 shown in FIG. 3 from the respective pressure values p1 and p2, p3 and p4 as well as p5 and p6, from which differential pressures the flow rates at the throttle orifices 15 of the sensors 9 can be determined. Furthermore, it is provided that in the valve controller 10, using a suitable algorithm and, if necessary, using parameters that were determined for the individual intake ducts 5 and the valves 7 (not shown in FIG. 3), model-based pressures can be calculated for the intake openings 6, which are indicated in FIG. 3 as pressures pm1, pm2 and pm3.

FIG. 3 also shows a section of a silicon wafer 4, not shown to scale, which is to be mounted on the mounting table 2 and which has a considerable surface curvature, for example due to previous machining processes.

Figure 4:
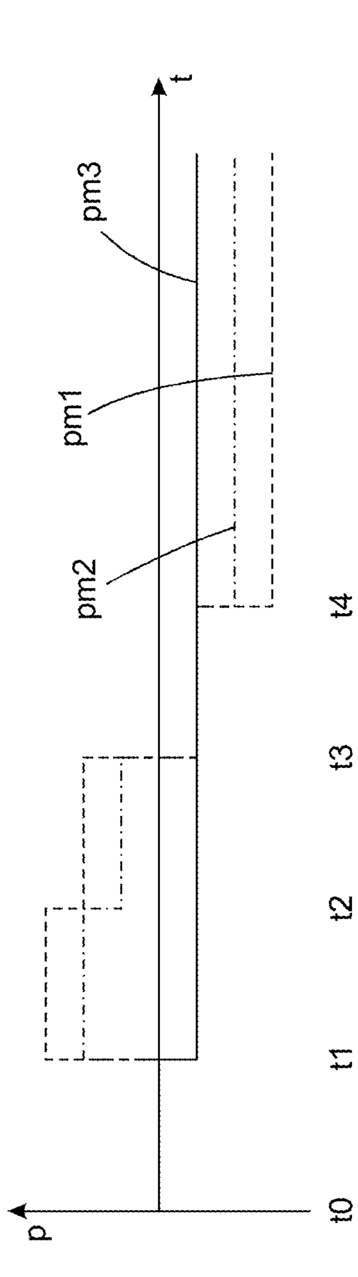

In order to achieve the flattest possible support of the silicon wafer 4 on the clamping table 2, an individual pressure curve is provided for the respective suction channels 5, as shown in purely schematic form in FIG. 4.

As an example, it is provided that at the suction opening 6.1, at which the model-based pressure pm1 can be determined by the valve controller 10, positive pressurization with a high positive pressure level is carried out at a time t1.

Furthermore, at the intake opening 6.2, at which the model-based pressure pm2 can be determined by the valve controller 10, pressurization is carried out at a medium overpressure level at time t1.

At the intake opening 6.3, at which the model-based pressure pm3 can be determined by the valve controller 10, a negative pressure is applied at a negative pressure level at time t1.

This combination of pressurization with positive pressure and pressurization with negative pressure achieves adhesion of the silicon wafer 4 in the area of the intake opening 6.3, while the silicon wafer 4 initially still has a considerable distance from the clamping table 2 in the areas of the intake openings 6.1 and 6.2.

The negative pressure at the suction opening 6.3 is maintained at a constant level from time t1 and is not mentioned again below.

At time t2, the positive pressurization at the intake opening 6.1 is reduced to a medium positive pressure level and the negative pressurization at the intake opening 6.2 is reduced to a low negative pressure level.

At time t3, there is a change to negative pressurization with a low negative pressure level at the intake opening 6.1 and at the intake opening 6.2.

At time t4, the vacuum level at the intake opening 6.1 is further reduced to a high vacuum level, while the vacuum level at the intake opening 6.2 is further reduced to a medium vacuum level.

This sequence of different above pressure levels and below pressure levels is intended to prevent the formation of air cushions between the silicon wafer 4 and the clamping table 2. Regardless of the strategy used in each case with regard to the sequence of pressure levels for positive pressurizing and negative pressurizing the respective suction channels 5, it is important for the reliable clamping of the flexible material that precise pressure control can be carried out for each of the suction openings 6 by using the model-based pressure determination.

The invention claimed is:

1. A valve module, comprising a valve controller, at least one valve and at least one fluid channel, wherein a first end region of the fluid channel is equipped with a fluid coupling and wherein a second end region of the fluid channel is connected to the valve, wherein the valve influences a fluid flow in the fluid channel, wherein a sensor is assigned to the fluid channel, which sensor determines a flow rate value in the fluid channel and which sensor is electrically connected to the valve controller, wherein the valve controller performs a model-based determination of a fluid pressure using the flow rate value for a measuring point located outside the valve module.

2. The valve module according to claim 1, wherein the sensor comprises a first pressure sensor attached to the fluid channel and further comprises a second pressure sensor attached to the fluid channel at a distance from the first pressure sensor, wherein a section of the fluid channel between the first pressure sensor and the second pressure sensor serves as a measuring section and wherein the first pressure sensor and the second pressure sensor are electrically connected to the valve controller, which valve controller processes a first sensor signal from the first pressure sensor and a second sensor signal from the second pressure sensor to determine the model-based fluid pressure at the measuring point.

3. The valve module according to claim 1, wherein the valve controller determines the fluid pressure at the measuring point using the flow rate value and at least one pressure signal from the group: first pressure signal, second pressure signal.

4. The valve module according to claim 1, wherein the valve controller provides a pressure control at the measuring point.

5. A method for operating a valve module, the valve module comprising a valve controller, at least one valve and at least one fluid channel, wherein a first end region of the fluid channel is equipped with a fluid coupling and wherein a second end region of the fluid channel is connected to the valve, wherein the valve influences a fluid flow in the fluid channel, wherein a sensor is assigned to the fluid channel, which sensor determines a flow rate value in the fluid channel and which sensor is electrically connected to the valve controller, wherein the valve controller performs a model-based determination of a fluid pressure using the flow rate value for a measuring point located outside the valve module, the method comprising the steps of: connecting the at least one fluid coupling of the valve module to an intake duct of a clamping table, which intake duct has intake openings being arranged in a mutually delimited surface region of the clamping table, wherein the measuring point is located at one of the intake-openings, carrying out an application of negative pressure or positive pressure to the intake openings, wherein the model-based fluid pressure is used for the pressure-controlled application of the negative pressure or the positive pressure at the intake openings.

6. The method according to claim 5, wherein the model-based fluid pressures determined for the intake openings of the respective surface regions during the negative pressure application, or the positive pressure application are stored as reference pressures in the valve controller.

7. The method according to claim 6, wherein the provision of negative pressure or positive pressure to the surface regions of the clamping table is carried out without a flexible material resting on the clamping table and wherein the determined reference pressures are stored as a first group of reference pressures in the valve controller.

8. The method according to the claim 7, wherein the valve controller determines a distance between the flexible material resting on the clamping table for each surface area from the respective reference pressure of the first group of reference pressures and from the respective reference pressure of the second group of reference pressures, and wherein a target pressure for the subsequent application of negative pressure to the respective surface region is determined for each of the surface regions as a function of an amount of the determined distance.

9. The method according to claim 8, wherein the valve controller applies a negative pressure to the surface regions of the clamping table in succession over time, wherein surface regions having a smaller distance from the flexible material are subjected to negative pressure earlier than surface areas with a greater distance to the flexible material and wherein a model-based actual pressure is determined for each of the surface areas, which model-based actual pressure is used in the valve controller together with a respective predetermined target pressure for negative pressure control in the respective surface area.

10. The method according to claim 6, wherein the provision of negative pressure or positive pressure to the surface regions of the clamping table is carried out with a flexible material resting on the clamping table, and wherein the determined reference pressures are stored as a second group of reference pressures in the valve controller.

* * * * *